United States Patent
Namiki

(10) Patent No.: US 6,662,125 B2
(45) Date of Patent: Dec. 9, 2003

(54) ELECTROMAGNETIC WAVE ANALYZER AND PROGRAM FOR SAME

(75) Inventor: Takefumi Namiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 10/022,539

(22) Filed: Dec. 20, 2001

(65) Prior Publication Data

US 2003/0050760 A1 Mar. 13, 2003

(30) Foreign Application Priority Data

Jun. 26, 2001 (JP) ........................................ 2001-193224

(51) Int. Cl.$^7$ .............................................. G01R 13/00
(52) U.S. Cl. .............................. 702/66; 702/66; 702/57; 702/73; 702/77; 702/189; 703/2; 703/13; 708/840; 708/832; 708/679; 708/514; 324/76.21; 324/76.12; 324/76.14
(58) Field of Search ............................... 702/57, 65–71, 702/73, 75, 77, 115, 124, 126, 189, 190, 196, FOR 103, FOR 104, FOR 106, FOR 130, FOR 155, FOR 157, FOR 170, FOR 171; 324/76.2, 76.14, 76.21; 706/920, 932; 703/2–5, 13; 712/2, 10, 36; 716/20; 708/5–9, 164, 191, 306, 308, 400, 404, 420, 820, 822, 840

(56) References Cited

U.S. PATENT DOCUMENTS

| | | | | |
|---|---|---|---|---|
| 5,880,838 A | * | 3/1999 | Marx et al. ................. | 356/351 |
| 6,141,676 A | * | 10/2000 | Ramirez-Angulo et al. . | 708/804 |
| 6,219,629 B1 | | 4/2001 | Namiki ......................... | 703/13 |
| 6,226,599 B1 | | 5/2001 | Namiki ......................... | 702/57 |
| 2002/0042698 A1 | * | 4/2002 | Meuris et al. ................. | 703/2 |

FOREIGN PATENT DOCUMENTS

JP 11352166 12/1999

OTHER PUBLICATIONS

Taflove, Advances in Finite–Difference Time–Domain (FD–TD) Numerical Modeling Techniques for Maxwell's Equaitons, Apr. 1995, IEEE, vol.: 407, pp. 53–58.*

Takefumi Namiki, et al., "A Proposal of Accuracy Correction Technique in FDTD Method When Nonuniform Cells Are Used", Technical Report of IEICE, pp. 55–60, Jan. 19, 2001 published by the Institute of Electronics, Information and Communication Engineers (IEICE), announced at Nagasaki Univ. of Jan. 26, 2001.

Takefumi Namiki, et al., "Local Accuracy–Correction Technique for FDTD Method Using High–Order Implicit Scheme", Proceedings of the 2001 IEICE General Conference, p. 8, Mar. 7, 2001, published by IEICE, announced at Ritsumeikan Univ. on Mar. 26, 2001.

* cited by examiner

Primary Examiner—Marc S. Hoff
Assistant Examiner—Elias Desta
(74) Attorney, Agent, or Firm—Staas & Halsey LLP

(57) ABSTRACT

An electromagnetic wave analyzer and program which can handle non-uniform cells with smaller computation errors. A given computational domain is divided into a plurality of cells for the purpose of finite difference approximation. For each space point, a cell size identification unit identifies the uniformity of surrounding cells. When the surrounding cells are identified as being uniform in size, a first calculation unit calculates electromagnetic field components at that space point with a first calculation method. When the surrounding cells are identified as being non-uniform in size, a second calculation unit calculates the same with a second calculation method which has smaller computational errors than the first calculation method. A data output unit then outputs the calculated electromagnetic field values.

12 Claims, 14 Drawing Sheets

|  | Δx | Δy | Δz |
|---|---|---|---|
| Minimum | 0.200 | 0.050 | 0.069 |
| Maximum | 2.000 | 2.000 | 1.200 |

Unit: mm

FIG. 11

|  | Resonant Frequency (GHz) | Relative error (%) |
|---|---|---|
| Measured | 7.0100 |  |
| Conventional Method | 6.8624 | 2.10 |
| Present Method | 6.9756 | 0.49 |

FIG. 13

|  | CPU Time (sec) | Memory Size (MB) |
|---|---|---|
| Conventional Method | 493 | 5.5 |
| Present Method | 666 | 6.4 |

FIG. 14

ELECTROMAGNETIC WAVE ANALYZER AND PROGRAM FOR SAME

BACKGROUND OF THE INVENTION

1. Field of the Invention

The present invention relates to an electromagnetic wave analyzer and program which analyze electromagnetic waves by solving Maxwell's equations in the time and spatial domains with finite difference methods. More particularly, the present invention relates to an electromagnetic wave analyzer and program which divide a computational domain into non-uniform cells to solve Maxwell's equations.

2. Description of the Related Art

Today's computational electromagnetics exploits the finite-difference time-domain (FD-TD) method as a technique to analyze the transitional behavior of electromagnetic waves, using computers for numerical calculation. The FD-TD algorithm solves Maxwell's equations in time and spatial domains with finite difference methods. Because of its wide scope of applications and improved accuracy and efficiency, FD-TD solvers are used in various situations in these years. For details of FD-TD methods, see the following literatures: K. S. Yee, "Numerical solution of initial boundary value problems involving Maxwell's equations in isotropic media," IEEE Trans. Antennas and Propagation, Vol. 14, pp. 302–307, 1966; and A. Taflove, "Computational Electrodynamics," MA, Artech House, 1995.

As mentioned above, the FD-TD algorithm solves Maxwell's equations including two rotations, with difference methods in both the time domain (t) and spatial domain (x, y, z). The next part will present specific Maxwell's equations for some different numbers of spatial dimensions. The following notation will be used to describe each problem:

Ex, Ey, Ez: electric field components in the x-, y-, and z-axis directions

Hx, Hy, Hz: magnetic field components in the x-, y-, and z-axis directions $\mu$: permeability $\varepsilon$: dielectric constant $\sigma$: electrical conductivity First, in a one-dimensional space, the following two equations express how the electromagnetic waves propagate in the x-axis direction.

$$\mu \frac{\partial H_y}{\partial t} = \frac{\partial E_z}{\partial x} \quad (1)$$

$$\varepsilon \frac{\partial E_z}{\partial t} + \sigma E_z = \frac{\partial H_y}{\partial x} \quad (2)$$

In a two-dimensional space, the transverse magnetic (TM) waves propagating in the x-axis and y-axis directions are expressed as follows.

$$\mu \frac{\partial H_x}{\partial t} = -\frac{\partial E_z}{\partial y} \quad (3)$$

$$\mu \frac{\partial H_y}{\partial t} = \frac{\partial E_z}{\partial x} \quad (4)$$

$$\varepsilon \frac{\partial E_z}{\partial t} + \sigma E_z = \frac{\partial H_y}{\partial x} - \frac{\partial H_x}{\partial y} \quad (5)$$

Similarly, the following partial differential equations give the behavior of transverse electric (TE) waves in a two-dimensional space.

$$\varepsilon \frac{\partial E_x}{\partial t} + \sigma E_x = \frac{\partial H_z}{\partial y} \quad (6)$$

$$\varepsilon \frac{\partial E_y}{\partial t} + \sigma E_y = -\frac{\partial H_z}{\partial x} \quad (7)$$

$$\mu \frac{\partial H_z}{\partial t} = \frac{\partial E_x}{\partial y} - \frac{\partial E_y}{\partial x} \quad (8)$$

Lastly, electromagnetic waves in a three-dimensional space are expressed in the systems of six coupled partial differential equations as follows.

$$\varepsilon \frac{\partial E_x}{\partial t} + \sigma E_x = \frac{\partial H_z}{\partial y} - \frac{\partial H_y}{\partial z} \quad (9)$$

$$\varepsilon \frac{\partial E_y}{\partial t} + \sigma E_y = \frac{\partial H_x}{\partial z} - \frac{\partial H_z}{\partial x} \quad (10)$$

$$\varepsilon \frac{\partial E_z}{\partial t} + \sigma E_z = \frac{\partial H_y}{\partial x} - \frac{\partial H_x}{\partial y} \quad (11)$$

$$\mu \frac{\partial H_x}{\partial t} = \frac{\partial E_y}{\partial z} - \frac{\partial E_z}{\partial y} \quad (12)$$

$$\mu \frac{\partial H_y}{\partial t} = \frac{\partial E_z}{\partial x} - \frac{\partial E_x}{\partial z} \quad (13)$$

$$\mu \frac{\partial H_z}{\partial t} = \frac{\partial E_x}{\partial y} - \frac{\partial E_y}{\partial x} \quad (14)$$

The FD-TD method is applied to a given computational domain, which is normally discretized into small meshes or boxes, called "cells" or "differencing grids." The size of those cells is one of the major factors that govern computational errors in FD-TD analysis. Electromagnetic waves may exhibit a sudden change in their transitional behavior in some particular region of the computational domain, often resulting in increased numerical errors. Such errors, however, can be reduced to an acceptable level if the selected cell size is sufficiently small.

Obviously, the simplest way of spatial discretization is to divide a given computational domain into evenly spaced grids. This uniform discretization, however, is likely to produce a large number of cells, thus consuming more computational resources including CPU time and memory space. To optimize the analytical model of interest, researchers often divide a computational domain into differently sized cells. This non-uniform discretization technique reduces the total number of cells, effectively alleviating the processing burden on the computer.

However, such a non-uniform computational domain has a known problem that the numerical error would increase at a boundary between two regions having different cell sizes. Such boundaries are referred to herein as the "cell-size boundaries." Since the spatial step size changes at a cell-size boundary, the midpoint between two adjacent cells does not lie on that cell-to-cell boundary, unlike the cases of uniform discretization. The consequent displacement of assumed calculation points aggravates the accuracy of finite difference approximation, resulting in increased truncation errors.

The central differencing technique is known to be second-order accurate for equally sized cells. However, the accuracy of this technique is reduced to the first order at cell-size boundaries because the assumption of spatial uniformity fails in such particular space points. The resulting computational errors could sometimes reach a intolerable level for certain types of objects to be analyzed.

SUMMARY OF THE INVENTION

In view of the foregoing, it is an object of the present invention to provide an electromagnetic wave analyzer capable of handling non-uniform cells with smaller computational errors.

Another object of the present invention is to provide an electromagnetic wave analyzing program which divides a given computational domain into a plurality of cells and numerically analyzes the behavior of transitional electromagnetic fields on an individual cell basis, without introducing any additional errors.

To accomplish the first object, according to the present invention, there is provided an electromagnetic wave analyzer which divides a given computational domain into a plurality of cells and numerically analyzes transitional behavior of electromagnetic fields on an individual cell basis. This analyzer comprises the following elements: a cell size identification unit which identifies the uniformity of cells that surround each space point defined in the computational domain; a first calculation unit which calculates electromagnetic field components at a space point with a first calculation method when the cell size identification unit has identified the surrounding cells as being uniform in size; a second calculation unit which calculates electromagnetic field components at a space point with a second calculation method when the cell size identification unit has identified the surrounding cells as being non-uniform in size, where the second calculation method has smaller computational errors than those of the first calculation method; and a data output unit which outputs the electromagnetic field components at every space point which have been calculated by the first and second calculation units.

To accomplish the second object, the present invention provides a computer program product which enables a computer to divide a given computational domain into a plurality of cells and numerically analyze transitional behavior of electromagnetic fields on an individual cell basis. This program causes the computer to perform the steps of: (a) identifying uniformity of cells that surround each space point defined in the computational domain; (b) calculating electromagnetic field components at a space point with a first calculation method when the surrounding cells are identified as being uniform in size; (c) calculating electromagnetic field components at a space point with a second calculation method when the surrounding cells are identified as being non-uniform in size, the second calculation method having smaller computational errors than those of the first calculation method; and (d) outputting the electromagnetic field components at every space point which have been calculated in the first and second calculating steps (b) and (c).

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 shows the minimum and maximum cell sizes in the computational model of FIG. 10;

FIG. 13 shows a comparison between the present method and conventional method in terms of resonant frequencies and their relative errors; and FIG. 14 shows a comparison of the two methods in terms of CPU time and memory space consumption.

DESCRIPTION OF THE PREFERRED EMBODIMENTS

Preferred embodiments of the present invention will be described below with reference to the accompanying drawings.

Figure 1:
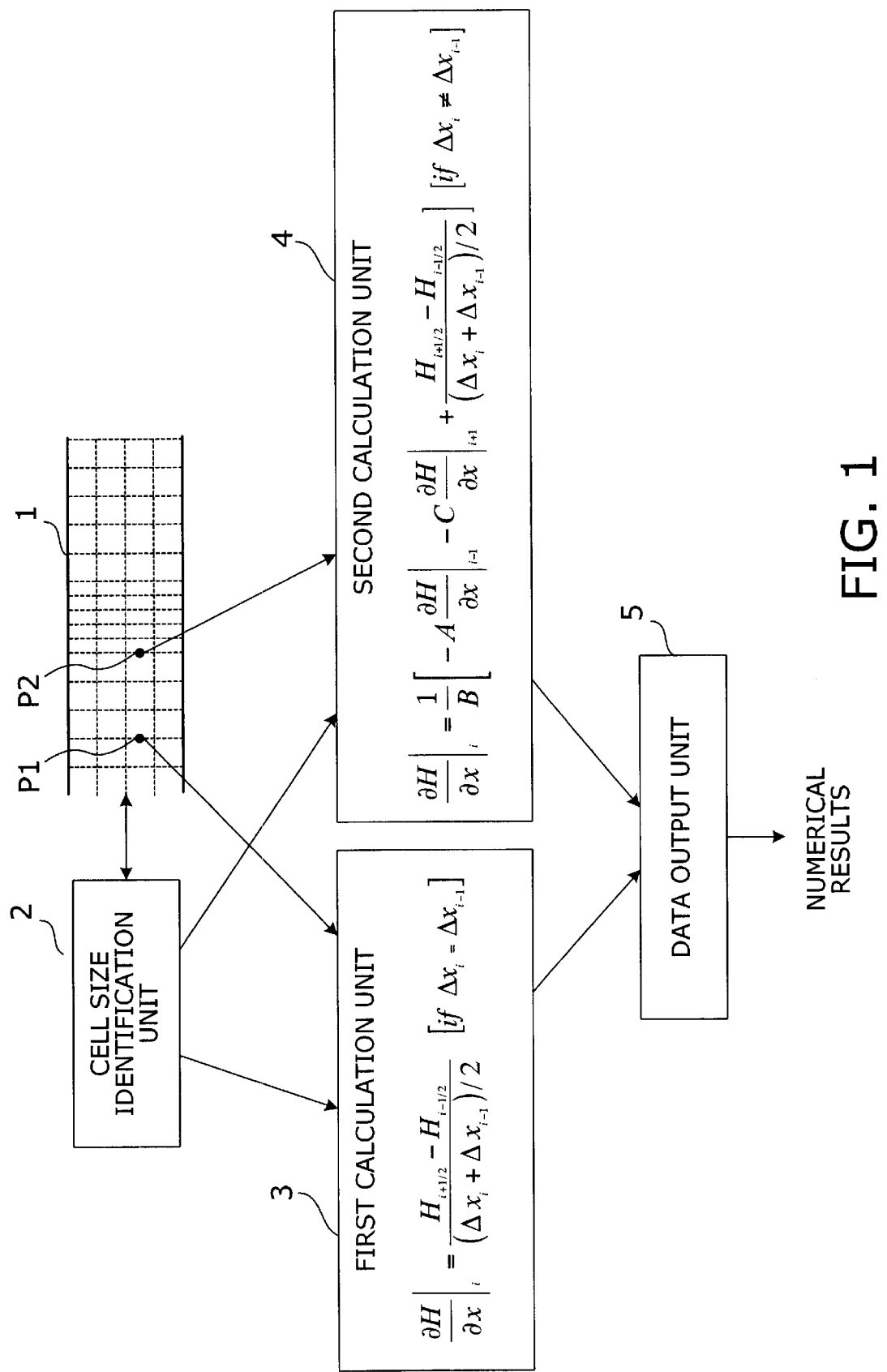
FIG. 1 shows a conceptual view of the present invention.

FIG. 1 shows a conceptual view of the present invention. The present invention provides an electromagnetic wave analyzer which numerically analyzes the behavior of electromagnetic waves by solving Maxwell's equations in the time and spatial domains with difference methods. Specifically, a given computational domain 1 is divided into a plurality of small cells suitable for finite difference approximation, so that the transitional behavior of the electromagnetic field can be numerically calculated on an individual cell basis.

The proposed electromagnetic wave analyzer has the following elements: a cell size identification unit 2, a first calculation unit 3, a second calculation unit 4, and a data output unit 5. For each space point P1, P2, and so on within the computational domain 1, the cell size identification unit 2 examines whether the surrounding cells are uniform in size. More specifically, the cell size identification unit 2 compares every pair of adjacent cells in terms of the width, depth, or height, for each axis of the computational domain 1. If two adjacent cells have the same dimension in a certain axis direction, the two cells are said to be of uniform size, meaning that the electromagnetic analysis will assume the spatial uniformity in that direction. If the two adjacent cells have different dimensions from each other, they will be treated as non-uniform cells in the analysis. In this way, the cell size identification unit 2 tests the local uniformity around every space point defined in the discretized computational domain 1, scanning the cells in each individual axis direction.

According to the present invention, the proposed analyzer uses two different algorithms, depending on the local uniformity of cells. The first calculation unit 3 calculates electromagnetic field values at the calculation point P1 with a first calculation method when the cell size identification unit 2 has determined that its surrounding cells are uniform in size. More specifically, the first calculation unit 3 calculates partial derivatives of the magnetic or electric field, based on the current magnetic field components that have already been calculated, rather than using an implicit scheme (i.e., a calculation method based on an implicit algorithm).

The second calculation unit 4 calculates electromagnetic field values at the calculation point P2 with a second calculation method which has smaller computational errors than the first calculation method, when the cell size identification unit 2 has determined that its surrounding cells are non-uniform in size. More specifically, the second calculation unit 4 calculates partial derivatives of the magnetic or electric field at the point P2 on a cell-size boundary, using a high-order implicit scheme. In this calculation, the second calculation unit 4 solves the equations with an implicit scheme, using partial derivatives representing the current electromagnetic field around the calculation point P2. Those partial derivatives are supplied from the first calculation unit 3. The data output unit 5 collects the calculated electromagnetic field values from the first and second calculation units 3 and 4 and outputs them.

The above electromagnetic wave analyzer solves an FD-TD problem, scanning a discretized computational domain 1. When it is going through an evenly divided region (called "uniform cell region") of the computational domain 1, the cell size identification unit 2 identifies that each calculation point is surrounded by uniform cells. The electromagnetic wave analyzer then activates the first calculation unit 3, thus calculating electromagnetic field values at each calculation point with the first calculation method. When the electromagnetic wave analyzer encounters a cell-size boundary, the cell size identification unit 2 indicates that the current calculation point is surrounded by non-uniform cells. This indication activates the second calculation unit 4 to calculate electromagnetic field values with the second calculation method, which is more accurate than the first calculation method. The data output unit 5 collects and outputs the electromagnetic field values calculated by the first and second calculation units 3 and 4.

As seen from the above explanation, the present invention allows spatial discretization with different cell sizes. To this end, the proposed analyzer uses two algorithms to calculate electromagnetic fields, depending on whether the space point of current interest is within a uniformly discretized region or on a boundary between differently discretized regions. In FD-TD algorithms, magnetic field components are placed at the center of each cell, while electric field components are arranged on cell boundaries. The next section will present an example of FD-TD electromagnetic field computation according to the present invention.

For illustrative purposes, a simple one-dimensional problem will be considered, under the assumption that the electric conductivity σ is zero throughout the domain. Physical quantities representing electromagnetic field components are functions of time and space. To indicate a specific time and/or space point, the following notation will be used in equation (15) and all subsequent finite-difference expressions.

Superscript represents a particular point in simulation time at which the electromagnetic field components are calculated. The temporal axis is discretized with a fixed time increment $\Delta t$. The electromagnetic wave analyzer calculates electromagnetic field values at the (n+1)th time point $\Delta t \times (n+1)$, when the past transitional behavior of electromagnetic waves until the previous time point ($\Delta t \times n$) is known. For convenience, n represents the time point $\Delta t \times n$. Likewise, (n+1) and (n+1/2) denote the time points $\Delta t \times (n+1)$ and $\Delta t \times (n+1/2)$, respectively.

Subscript represents a particular point in the computational domain at which the electromagnetic field components are calculated. The computational domain is divided into small cells with distances $\Delta x$ in the x-axis direction. (x is also referred to as the "spatial step size" or "cell size".) The coordinate of the i-th space point is $i \times \Delta x$, where the variable i is a non-negative integer indicating the beginning point of the i-th cell. Likewise, (i+1) represents the front edge of the (i+1)th cell, and accordingly, (i+1/2) indicates the center of the i-th cell.

With the above notation, the magnetic field at time point (n+1/2) is expressed as:

$$H^{n+1/2} = H^{n-1/2} + \left[\frac{\Delta t}{\mu}\right] \cdot \left.\frac{\partial E}{\partial x}\right|_{i+1/2}^{n} \tag{15}$$

In this equation (15), the partial derivative (also called the "partial differential coefficient") of the electric field E is calculated by:

$$\left.\frac{\partial E}{\partial x}\right|_{i+1/2} = \frac{E_{i+1} - E_i}{\Delta x_i} \tag{16}$$

The electric field at time point (n+1) is then expressed as:

$$E^{n+1} = E^n + \left[\frac{\Delta t}{\varepsilon}\right] \cdot \left.\frac{\partial H}{\partial x}\right|_{i}^{n+1/2} \tag{17}$$

In uniform cell regions, the partial derivative of the magnetic field in equation (17) is obtained by:

$$\left.\frac{\partial H}{\partial x}\right|_{i} = \frac{H_{i+1/2} - H_{i-1/2}}{(\Delta x_i + \Delta x_{i-1})/2} \quad [\text{if } \Delta x_i = \Delta x_{i-1}] \tag{18}$$

Note that the finite difference approximation on the right side of (18) is second-order accurate in terms of truncation errors, as will be described in detail later.

On the other hand, the partial derivative of magnetic field on a cell-size boundary is expressed as follows:

$$\left.\frac{\partial H}{\partial x}\right|_{i} = \frac{1}{B}\left[-A\left.\frac{\partial H}{\partial x}\right|_{i-1} - C\left.\frac{\partial H}{\partial x}\right|_{i+1} + \frac{H_{i+1/2} - H_{i-1/2}}{(\Delta x_i + \Delta x_{i-1})/2}\right] \tag{19}$$

$[\text{if } \Delta x_i \neq \Delta x_{i-1}]$ where $A = \dfrac{(-2\Delta x_i^2 + 2\Delta x_i \Delta x_{i-1} + \Delta x_{i-1}^2)}{12\Delta x_{i-1}(\Delta x_i + \Delta x_{i-1})}$ (20)

$C = \dfrac{(\Delta x_i^2 + 2\Delta x_i \Delta x_{i-1} - 2\Delta x_{i-1}^2)}{12\Delta x_i(\Delta x_i + \Delta x_{i-1})}$ (21)

$B = 1 - A - C$ (22)

Unlike the previous equation (18), the finite difference approximation on the right side of (19) is third-order accurate in terms of truncation errors. The accuracy of this approximation will be discussed in detail later.

As seen from the above, the electromagnetic wave analyzer takes a two-step approach when calculating partial derivatives at a cell-size boundary. First, it calculates partial derivatives at space points in uniform cell regions, other than the points on cell-size boundaries, by using finite difference approximations (16) and (18). Then it calculates partial derivatives at space points on the cell-size boundaries by using more accurate difference approximation (19).

It has been assumed in the above equations (15) to (22) that electric field components (E) and magnetic field components (H) are aligned alternately along a particular coordinate direction (e.g., x-axis direction in the above example); i.e., E components are located on the boundaries of cells, while H components are centered in each cell. The arrangement of those E and H components may, however, be changed so that E components are located in the center of each cell and H components on the boundaries of cells. If this is the case, the foregoing equations (15) to (22) would be modified in such a way that the variables E and H, as well as $\in$ and $\mu$, be replaced with each other.

As mentioned previously, the proposed electromagnetic wave analyzer employs an algorithm that reduces truncation errors in finite-difference approximation at space points on a boundary between two different cell regions. That is, the partial differential coefficients of electromagnetic fields at those particular space points are approximated with the third-order accurate algorithm of equation (19). For the other space points, the analyzer uses finite difference equations (16) and (18) based on the conventional central differencing algorithm. Since the integrity of the central differencing is guaranteed in such uniform cell regions, the resulting solution is proved to be accurate in the second order. In this way, the present invention avoids the increase of truncation errors, thus ensuring the numerical accuracy throughout the process of electromagnetic wave analysis with non-uniform spatial discretization. The next section will elaborate on the algorithm to improve the accuracy in FD-TD difference approximations.

Consider a Taylor series expansion of a function f(x) about a space point x to another space point $(x+\Delta x_i/2)$ and also to $(x-\Delta x_{i-1}/2)$.

$$f(x+\Delta x_i/2) = f(x) + \frac{\Delta x_i}{2 \cdot 1!}f' + \frac{\Delta x_i^2}{4 \cdot 2!}f'' + \frac{\Delta x_i^3}{8 \cdot 3!}f''' + \ldots \quad (23)$$

$$f(x-\Delta x_{i-1}/2) = f(x) - \frac{\Delta x_{i-1}}{2 \cdot 1!}f' + \frac{\Delta x_{i-1}^2}{4 \cdot 2!}f'' - \frac{\Delta x_{i-1}^3}{8 \cdot 3!}f''' + \ldots \quad (24)$$

Now, subtracting (24) from (23), we obtain the derivative of the function f as:

$$f' = \frac{f(x+\Delta x_i/2) - f(x-\Delta x_{i-1}/2)}{(\Delta x_i + \Delta x_{i-1})/2} - \quad (25)$$

$$\frac{\Delta x_i - \Delta x_{i-1}}{4}f'' - \frac{\Delta x_i^2 - \Delta x_i \Delta x_{i-1} + \Delta x_{i-1}^2}{24}f''' + \ldots$$

$$= \frac{f(x+\Delta x_i/2) - f(x-\Delta x_{i-1}/2)}{(\Delta x_i + \Delta x_{i-1})/2} + \delta(\Delta x_i - \Delta x_{i-1})O(\Delta x) + O(\Delta x^2)$$

Here, $\delta$ is the Kronecker's delta, which returns a value of zero when $(\Delta x_i-\Delta x_{i-1})=0$, and one when $(\Delta x_i-\Delta x_{i-1})\neq 0$. $O(\Delta x^m)$ is a shorthand notation for the remainder term, which approaches zero as the m-th power of $\Delta x$ becomes zero. Since $\Delta x$ is sufficiently smaller than one, $O(\Delta x^m)$ with a larger order value m has a stronger tendency to converge to zero.

While the above equations (23) to (25) are intended for finite difference approximation of a spatial derivative, the same method can also be applicable to a time derivative. This will be accomplished by simply substituting time t for coordinate x, time increment $\Delta t$ for spatial step size $\Delta x$, and time step index n for space point index i. The time-derivative version of equation (25) would have a term $\delta(\Delta t_n-\Delta t_{n-1})$. This term $\delta(\Delta t_n-\Delta t_{n-1})$ is always zero, because the time increment is assumed to be constant, which means $(\Delta t_i-\Delta t_{i-1})=0$.

Figure 2:
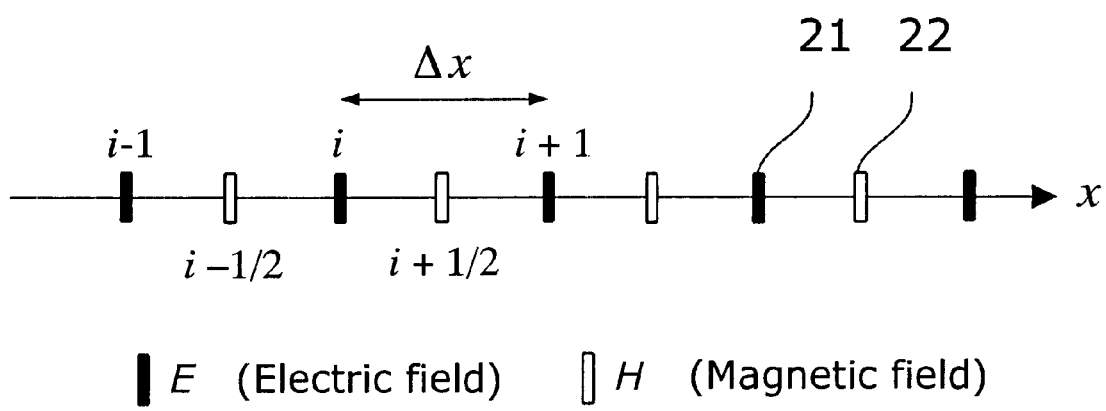
FIG. 2 shows an arrangement of electromagnetic field calculation points when a given computational domain is divided into uniform cells.

Based on the above-described Taylor series expansions, the difference expressions for uniform cells will be derived as follows. FIG. 2 illustrates the arrangement of electromagnetic field calculation points when a given computational domain is divided into uniform cells. In this figure, the black bars represent electric field calculation points 21, and the white bars represent magnetic field calculation points 22. These two kinds of space points are arranged alternately along the x axis. Although the computational domain is uni-dimensional, every portion between two consecutive electric field calculation points 21 is called a "cell," as in the two- and three-dimensional spaces. The distance between two adjacent electric field calculation points 21 is referred to as the spatial step size, or cell size, $\Delta x$.

In the uniform cell region, the electric field calculation points 21 are, by definition, evenly spaced with the distance $\Delta x$, and a magnetic field calculation point 22 is located at the midpoint of every two adjacent electric field calculation points 21. The magnetic field calculation point 22 centered in the i-th cell is referred to by the notation "i+1/2." In this context, the Kronecker's delta $\delta(\Delta x_i-\Delta x_{i-1})$ in equation (25) is zero because $\Delta x_i$ equals $\Delta x_{i-1}$.

Accordingly, the one-dimensional Maxwell's equations (1) and (2) will be solved as follows, by applying the finite difference method of equation (25) to both the time and space derivatives.

$$H^{n+1/2} = H^{n-1/2} + \left[\frac{\Delta t}{\mu}\right] \cdot \left.\frac{\partial E}{\partial x}\right|_{i+1/2}^{n} + O(\Delta t^2) \quad (26)$$

$$\left.\frac{\partial E}{\partial x}\right|_{i+1/2} = \frac{E_{i+1} - E_i}{\Delta x} + O(\Delta x^2) \quad (27)$$

$$E^{n+1} = E^n + \left[\frac{\Delta t}{\varepsilon}\right] \cdot \left.\frac{\partial H}{\partial x}\right|_i^{n+1/2} + O(\Delta t^2) \quad (28)$$

$$\left.\frac{\partial H}{\partial x}\right|_i = \frac{H_{i+1/2} - H_{i-1/2}}{\Delta x/2} + O(\Delta x^2) \quad (29)$$

In this way, the partial derivatives of electromagnetic field components are approximated with the central difference expressions of (27) and (29) in the time and spatial domains, when the given computational domain is uniformly divided into fixed-size cells. It should be noted that the truncation error in this difference approximation is of the second order.

Figure 3:
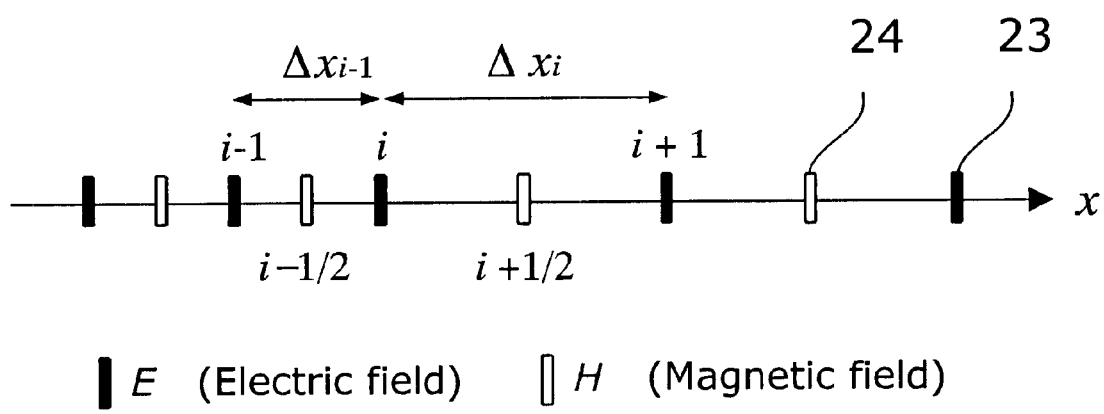
FIG. 3 shows an arrangement of electromagnetic field calculation points when a given computational domain is divided into non-uniform cells.

When there are differently-sized cells, the partial spatial derivatives at their boundaries may not be approximated correctly with the above-described central differencing method. Referring now to FIG. 3, the problem of increased truncation errors will be discussed below. FIG. 3 shows an arrangement of electromagnetic field calculation points when a given computational domain is divided in a non-uniform manner. As in FIG. 2, the black bars and white bars represent electric field calculation points 23 and magnetic field calculation points 24, respectively. These two kinds of space points are arranged alternately along the x axis. Every portion between two consecutive electric field calculation points 23 is called a "cell."

FIG. 3 illustrates two cell regions having different intervals of the electric field calculation points 23. More specifically, the distance between two electric field calculation points (i) and (i+1) is longer than that between (i−1) and (i). In other words, the cell size $\Delta x_{i-1}$ of the (i−1)th cell is different from the cell size $\Delta x_i$ of the i-th cell, meaning that the electric field calculation point (i) is right on the cell-size boundary.

At the electric field calculation point (i) on the cell-size boundary, the partial derivative of the magnetic field is calculated from the magnetic field components at the neighboring space points (i−1/2) and (i+1/2). Here, the former point (i−1/2) is located at the center of the (i−1)th cell, while the latter point (i+1/2) is located at the center of the i-th cell. The electric field calculation point (i), however, does not match with the midpoint between the two magnetic field calculation points (i−1/2) and (i+1/2). Because of this discrepancy, the above equation (29) for the partial derivative of the i-th electric field has to be rewritten as:

$$\left.\frac{\partial H}{\partial x}\right|_i = \frac{H_{i+1/2} - H_{i-1/2}}{(\Delta x_i + \Delta x_{i-1})/2} + \delta(\Delta x_i - \Delta x_{i-1})O(\Delta x) + O(\Delta x^2) \quad (30)$$

The second term on the right side of this new equation (30) suggests that the finite difference approximation would contain a first-order truncation error when the surrounding cells are different in size. Such an increase in truncation error could cause a considerable adverse effect on the accuracy of computational results, depending on the objects being analyzed.

The present invention addresses the above problem of increased truncation error by partly applying a high-order difference approximation. For high-order difference methods, refer to the following literatures: W. J. Goedheer and J. H. M. Potters, "A compact finite difference scheme on a non-equidistance mesh," Journal of Computational Physics, Vol. 61, pp. 269–279, 1985; and A. Taflove, "Advances in Computational Electro-dynamics," MA, Artech House, pp. 71, 1998.

According to the present invention, a finite difference method with a high-order implicit scheme is derived as follows. First, suppose the following Taylor series expansions:

$$f(x + \Delta x_i/2) = \qquad (31)$$
$$f(x) + \frac{\Delta x_i}{2}f' + \frac{\Delta x_i^2}{8}f'' + \frac{\Delta x_i^3}{48}f''' + \frac{\Delta x_i^4}{384}f'''' + O(\Delta x^5)$$

$$f(x - \Delta x_{i-1}/2) = \qquad (32)$$
$$f(x) - \frac{\Delta x_{i-1}}{2}f' + \frac{\Delta x_{i-1}^2}{8}f'' - \frac{\Delta x_{i-1}^3}{48}f''' + \frac{\Delta x_{i-1}^4}{384}f'''' + O(\Delta x^5)$$

$$f'(x + \Delta x_i) = \qquad (33)$$
$$f'(x) + \Delta x_i f'' + \frac{\Delta x_i^2}{2}f''' + \frac{\Delta x_i^3}{6}f'''' + \frac{\Delta x_i^4}{24}f''''' + O(\Delta x^5)$$

$$f'(x - \Delta x_{i-1}) = \qquad (34)$$
$$f'(x) - \Delta x_{i-1}f'' + \frac{\Delta x_{i-1}^2}{2}f''' - \frac{\Delta x_{i-1}^3}{6}f'''' + \frac{\Delta x_{i-1}^4}{24}f''''' + O(\Delta x^5)$$

Subtracting (32) from (31), we obtain:

$$f(x + \Delta x_i/2) - f(x - \Delta x_{i-1}/2) = \frac{\Delta x_i + \Delta x_{i-1}}{2}f' + \qquad (35)$$
$$\frac{\Delta x_i^2 - \Delta x_{i-1}^2}{8}f'' + \frac{\Delta x_i^3 + \Delta x_{i-1}^3}{48}f''' + \frac{\Delta x_i^4 - \Delta x_{i-1}^4}{384}f'''' + O(\Delta x^5)$$

Likewise, the subtraction of (34) from (33) yields:

$$f'(x + \Delta x_i) - f'(x - \Delta x_{i-1}) = (\Delta x_i + \Delta x_{i-1})f'' + \frac{\Delta x_i^2 - \Delta x_{i-1}^2}{2}f''' + \qquad (36)$$
$$\frac{\Delta x_i^3 + \Delta x_{i-1}^3}{6}f'''' + \frac{\Delta x_i^4 - \Delta x_{i-1}^4}{24}f''''' + O(\Delta x^5)$$

Subtracting (36) from (35), and then multiplying the difference by $(\Delta x_i - \Delta x_{i-1})/8$, we obtain;

$$\{f(x + \Delta x_i/2) - f(x - \Delta x_{i-1}/2)\} - \qquad (37)$$
$$\left(\frac{\Delta x_i - \Delta x_{i-1}}{8}\right)\{f'(x + \Delta x_i) - f'(x - \Delta x_{i-1})\} =$$
$$\left(\frac{\Delta x_i + \Delta x_{i-1}}{2}\right)f'(x) +$$
$$\frac{(-2\Delta x_i^2 + 5\Delta x_i \Delta x_{i-1} - 2\Delta x_{i-1}^2)(\Delta x_i + \Delta x_{i-1})}{48}f''' +$$
$$\frac{(-7\Delta x_i^2 + 8\Delta x_i \Delta x_{i-1} - 7\Delta x_{i-1}^2)(\Delta x_i^2 - \Delta x_{i-1}^2)}{384}f'''' + O(\Delta x^5)$$

Now we multiply (33) by $\Delta x_{i-1}$, as well as (34) by $\Delta x_i$, and sum up the two results, thus obtaining the following:

$$\Delta x_{i-1}f'(x + \Delta x_i) + \Delta x_i f'(x - \Delta x_{i-1}) = \qquad (38)$$
$$(\Delta x_i + \Delta x_{i-1})f' + \frac{\Delta x_i \Delta x_{i-1}(\Delta x_i + \Delta x_{i-1})}{2}f''' +$$
$$\frac{\Delta x_i \Delta x_{i-1}(\Delta x_i^2 - \Delta x_{i-1}^2)}{6}f'''' + O(\Delta x^5)$$

Equation (37) is then multiplied by $\Delta x_{i-1}\Delta x_i$, and equation (38) by $(-2\Delta x_i^2 + 5\Delta x_i\Delta x_{i-1} - 2\Delta x_{i-1}^2)/24$. Subtracting the latter from the former, we obtain:

$$\Delta x_i \Delta x_{i-1}\{f(x + \Delta x_i/2) - f(x - \Delta x_{i-1}/2)\} + \qquad (39)$$
$$\frac{(-\Delta x_i^2 \Delta x_{i-1} - 2\Delta x_i \Delta x_{i-1}^2 + 2\Delta x_{i-1}^3)}{24}f'(x + \Delta x_i) +$$
$$\frac{(2\Delta x_i^3 - 2\Delta x_i^2 \Delta x_{i-1} - \Delta x_i \Delta x_{i-1}^2)}{24}f'(x - \Delta x_{i-1}) =$$
$$\frac{(2\Delta x_i^2 + 7\Delta x_i \Delta x_{i-1} + 2\Delta x_{i-1}^2)(\Delta x_i + \Delta x_{i-1})}{24}f'(x) +$$
$$\delta(\Delta x_i - \Delta x_{i-1})O(\Delta x^6) + O(\Delta x^7)$$

Further, we divide both sides of (39) by $((\Delta x_{i-1} + \Delta x_{i-1})\Delta x_{i-1}\Delta x_{i-1})/2$. Simplifying the results, we obtain:

$$\left.A\frac{\partial H}{\partial x}\right|_{i-1} + \left.B\frac{\partial H}{\partial x}\right|_i + \left.C\frac{\partial H}{\partial x}\right|_{i+1} = \qquad (40)$$
$$\frac{H_{i+1/2} - H_{i-1/2}}{(\Delta x_i + \Delta x_{i-1})/2} + \delta(\Delta x_i - \Delta x_{i-1})O(\Delta x^3) + O(\Delta x^4)$$

where A, B, and C are what have previously been shown in equations (20) to (22). Since δ=0 for uniform cells, the following two equations will hold, regarding the electric field and magnetic field, respectively.

$$\left.a\frac{\partial E}{\partial x}\right|_{i-1/2} + \left.b\frac{\partial E}{\partial x}\right|_{i+1/2} + \left.c\frac{\partial E}{\partial x}\right|_{i+3/2} = \frac{E_{i+1} - E_i}{\Delta x/2} + O(\Delta x^4) \qquad (41)$$

$$a \frac{\partial H}{\partial x}\bigg|_{i-1} + b \frac{\partial H}{\partial x}\bigg|_{i} + c \frac{\partial H}{\partial x}\bigg|_{i+1} = \frac{H_{i+1/2} - H_{i-1/2}}{\Delta x/2} + O(\Delta x^4) \quad (42)$$

$$\text{where } a = c = \frac{1}{24}, \quad b = \frac{11}{12} \quad (43)$$

Equations (40), (41), and (42) may be incorporated in electromagnetic wave analysis. Within a uniform cell region, the analyzer would use equations (41) and (42), which are fourth-order accurate. Even when dealing with non-uniform cells around a cell-size boundary, the analyzer can enjoy the third-order accuracy of equation (40), which would be much better than the conventional methods.

Those equations (40) to (42) are known as implicit methods, which contain a plurality of partial derivative terms for the electric or magnetic field values at the same time point, but of the different space points. Generally, the analyzer has to solve simultaneous linear equations (44) to obtain such partial derivatives.

$$\begin{pmatrix} B_1 & C_1 & & & \\ A_2 & B_2 & C_2 & & 0 \\ & \ddots & & & \\ & & \ddots & & \\ 0 & & A_{i\max-1} & B_{i\max-1} & C_{i\max-1} \\ & & & A_{i\max} & B_{i\max} \end{pmatrix} \begin{pmatrix} \frac{\partial H}{\partial x}\big|_1 \\ \frac{\partial H}{\partial x}\big|_2 \\ \vdots \\ \vdots \\ \frac{\partial H}{\partial x}\big|_{i\max-1} \\ \frac{\partial H}{\partial x}\big|_{i\max} \end{pmatrix} = \begin{pmatrix} \frac{\Delta H_1}{\Delta} \\ \frac{\Delta H_2}{\Delta} \\ \vdots \\ \vdots \\ \frac{\Delta H_{i\max-1}}{\Delta} \\ \frac{\Delta H_{i\max}}{\Delta} \end{pmatrix} \quad (44)$$

Because the calculation of such simultaneous equations is time-consuming, it would not be practical at all to use the implicit method at every calculation point in a given computational domain. Considering the time-accuracy tradeoffs, one realistic approach is to implement the implicit algorithm of equation (40), not in whole, but only in part. In this case, the second-order accurate approximation (29) is used to calculate partial derivatives at most space points (other than those at cell size boundaries). The equation (29) provides an explicit method to solve the problem; i.e., the electric field component can be calculated directly from already known magnetic field values.

For the space points on a cell-size boundary, the analyzer now uses equation (40) to calculate the partial derivatives with an implicit method. Actually, the second term of the left side of the equation (40) can be obtained immediately because the first and third terms have already been calculated with equation (29) in the previous stage. The accuracy of the second term should be slightly sacrificed. That is, the accuracy would be of the second order since the second term is calculated from the known first and third terms, which are second-order accurate.

More specifically, the second term of the left side of equation (40) is calculated as follows.

$$\frac{\partial H}{\partial x}\bigg|_{i} = \frac{1}{B}\bigg[ -A \frac{\partial H}{\partial x}\bigg|_{i-1} - C \frac{\partial H}{\partial x}\bigg|_{i+1} + \quad (45)$$

$$\frac{H_{i+1/2} - H_{i-1/2}}{(\Delta x_i + \Delta x_{i-1})/2} + \delta(\Delta x_i - \Delta x_{i-1})O(\Delta x^3) \bigg]$$

Truncating the third-order remainder term $O(\Delta x^m)$, we obtain what has explained earlier as equation (19).

As seen from the above discussions, the present invention uses a high-order difference approximation algorithm at a limited part (i.e., cell size boundaries) of the computational domain. This approach enables the proposed analyzer to reduce the truncation error that is inherent in finite difference approximation, while suppressing the increase of computation time.

For simplicity the above explanation has been assumed a one-dimensional wave propagating in the x coordinate direction. The present invention, however, should not be limited to one-dimensional models, but can be expanded to two- or three-dimensional problems. The present invention is also applicable to such a space where the cell size varies continuously. If this is the case, the analyzer has to deal with a set of simultaneous linear equations to solve the equation (19).

Figure 4:
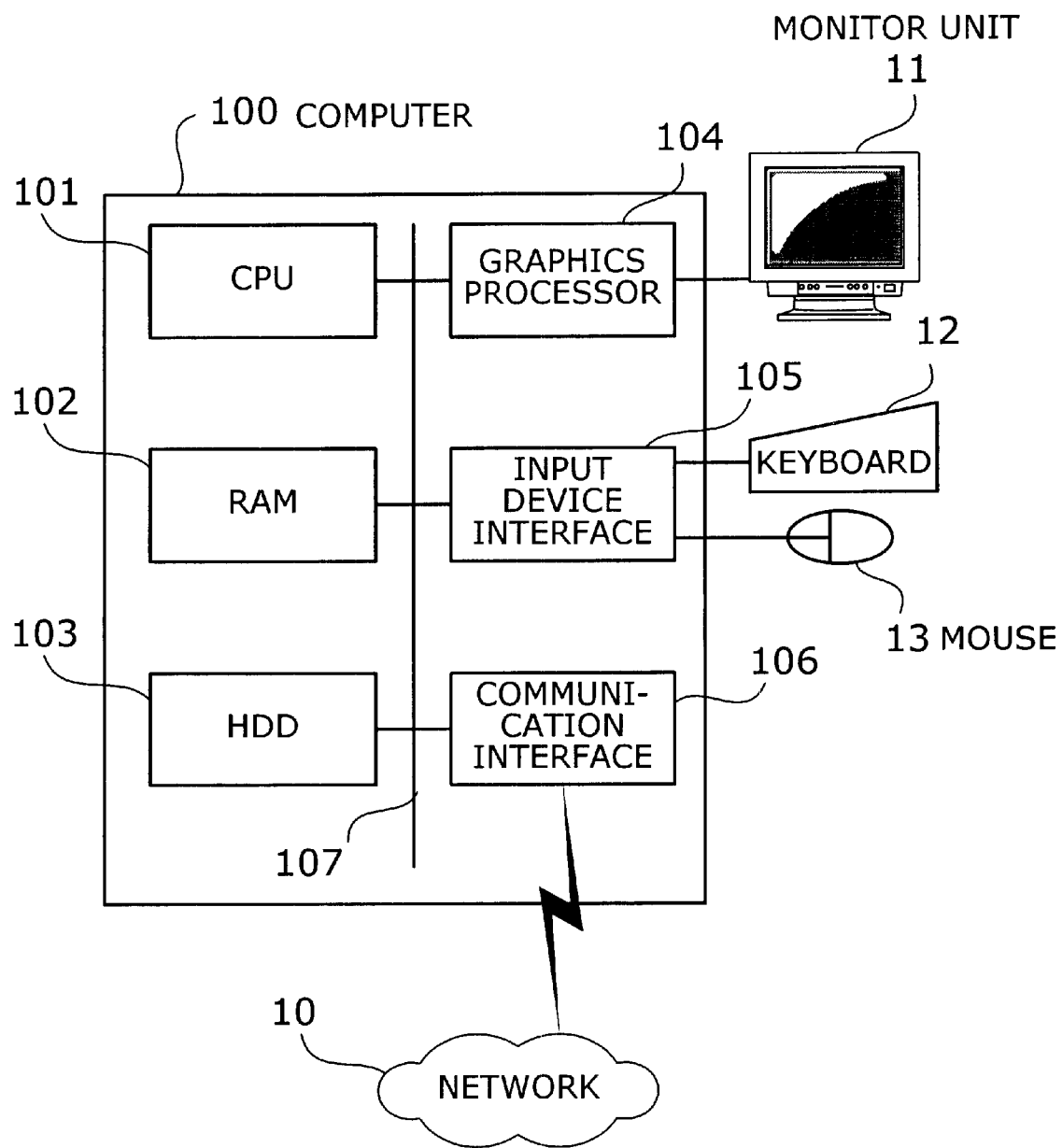
FIG. 4 shows an example of a computer platform on which the present invention is embodied.

The proposed electromagnetic wave analyzer is implemented on a computer system. FIG. 4 shows a typical hardware platform on which the invention is embodied. The illustrated computer system 100 is controlled entirely by a central processing unit (CPU) 101, which interacts with other elements via a common bus 107. Connected to the CPU 101 are: a random access memory (RAM) 102, a hard disk drive (HDD) unit 103, a graphics processor 104, an input device interface 105, and a communication interface 106.

The RAM 102 temporarily stores at least a part of operating system (OS) programs and application programs that the CPU 101 executes, in addition to other various data objects manipulated at runtime. The HDD unit 103 stores program and data files of the operating system and applications.

The graphics processor 104 produces video images in accordance with drawing commands from the CPU 101 and displays them on the screen of an external monitor unit 11 coupled thereto. The input device interface 105 is used to receive signals from external input devices, such as a keyboard 12 and a mouse 13. Those input signals are supplied to the CPU 101 via the bus 107. The communication interface 106 is connected to a wide area network 10, such as the Internet, to allow the CPU 101 to exchange data with other computers.

Figure 5:
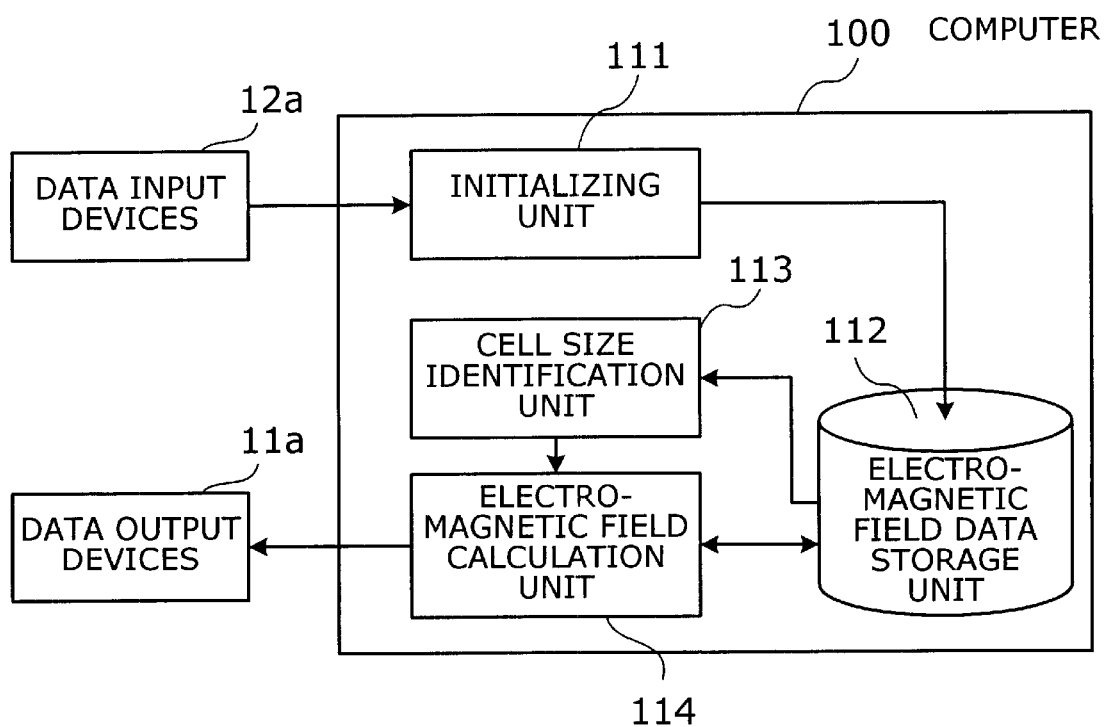
FIG. 5 is a functional block diagram of a computer which works as an electromagnetic wave analyzer.

The present invention is embodied on the computer hardware platform described above. The proposed computer program makes the illustrated computer 100 function as an electromagnetic wave analyzer. FIG. 5 is a functional block diagram of the computer 100 working as an electromagnetic wave analyzer. Connected to the computer 100 are data input devices 12a and data output devices 11a. The data input devices 12a, including a keyboard 12 and a mouse 13 (FIG. 4), permits the user to enter some initial parameters for performing a specific session of electromagnetic wave analysis. The data output devices 11a may include a monitor unit 11 (FIG. 4), to which the computer 100 sends out its numerical results to show the behavior of transitional electromagnetic waves.

The computer 100 comprises an initializing unit 111, an electromagnetic field data storage unit 112, a cell size identification unit 113, and an electromagnetic field calculation unit 114. The initializing unit 111 receives initial parameters from the data input devices 12a and configures the electromagnetic field data storage unit 112 with the received parameters. Those initial parameters may include the definition of a computational domain (e.g., cell size, dielectric constant, permeability, electrical conductivity) and the initial state of electromagnetic field.

The electromagnetic field data storage unit 112 is actually a memory space of, for example, the RAM 102 in the computer 100, which is used to store the simulation results representing the behavior of transitional electromagnetic fields calculated by the electromagnetic field calculation unit 114. The electromagnetic field data storage unit 112 is also used to record the initial parameters given by the initializing unit 111.

The cell size identification unit 113 identifies cell-size boundaries in the computational domain, with reference to the cell size parameters stored in the electromagnetic field data storage unit 112. It informs the electromagnetic field calculation unit 114 of the locations of the identified cell-size boundaries.

The electromagnetic field calculation unit 114 calculates the transitional behavior of electromagnetic fields, on the basis of electromagnetic field data in the electromagnetic field data storage unit 112. All the numerical results are saved into the electromagnetic field data storage unit 112 in a sequential manner. When the time step reaches the end of a predetermined simulation period, the electromagnetic field calculation unit 114 outputs the simulation results to the data output devices 11a. The result data includes electromagnetic field values at predefined space points at each time step, which visualize how the electromagnetic waves propagate in the given space.

Figure 6:
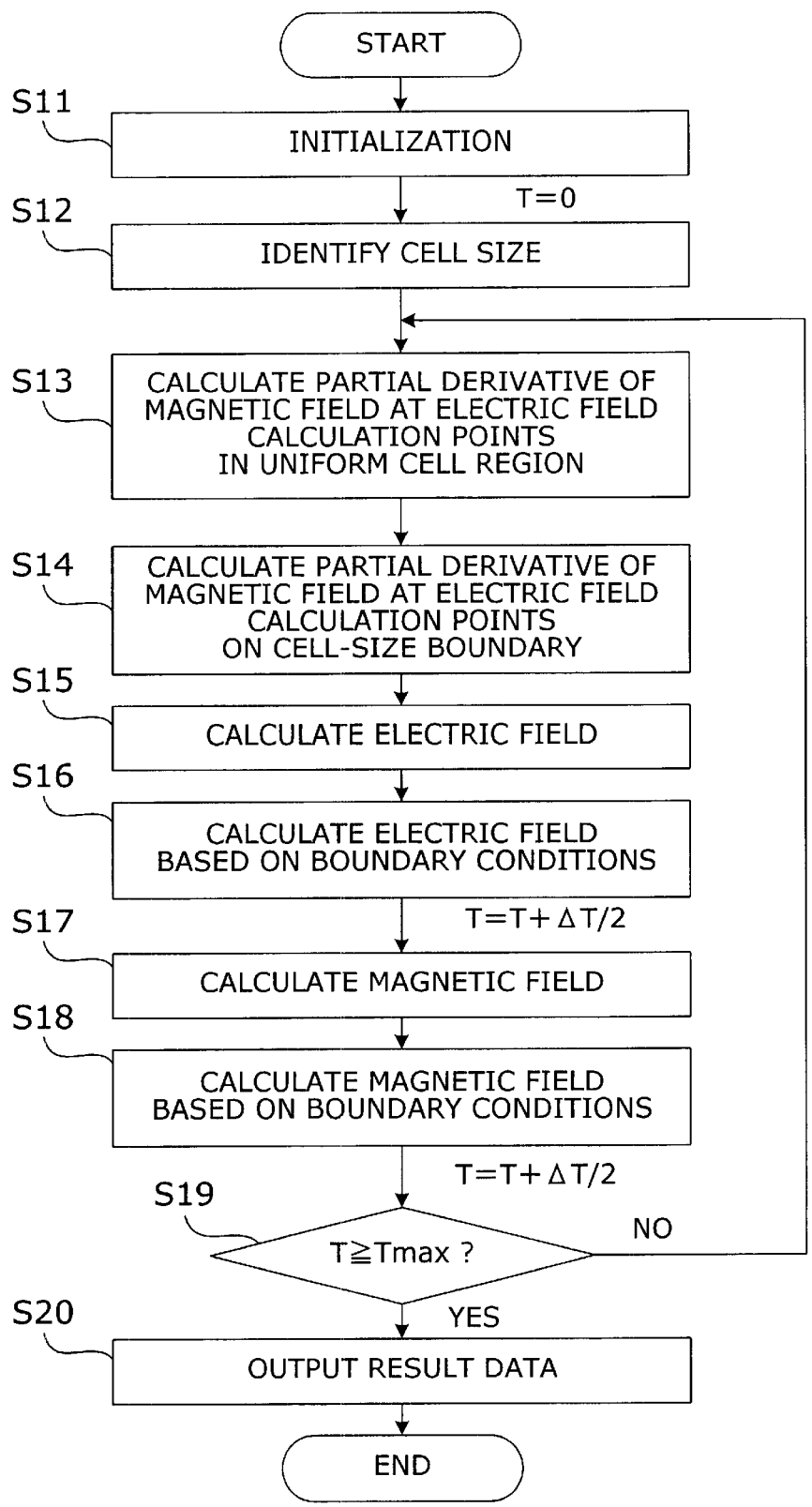
FIG. 6 is a flowchart which shows a process of analyzing electromagnetic waves according to the present embodiment.

FIG. 6 is a flowchart which shows a process of analyzing electromagnetic waves according to the present embodiment. This process is executed in the following steps:

(S11) The initializing unit 111 sets up the system with initial parameters entered through the data input devices 12a. Included in this initial setup are: the number of cells, cell sizes, properties of each cell (e.g., dielectric constant $\in$, permeability $\mu$, electrical conductivity $\sigma$ of the material or medium), boundary conditions (e.g., absorbing boundary conditions, electrical wall boundary conditions) excitation conditions (e.g., wave source location, waveform), simulation end time, and time step size. Other parameters such as coefficients for electromagnetic calculation are also computed in this step S11. The time step counter T is then cleared to zero.

(S12) The cell size identification unit 113 examines the size of each initialized cell. Through this task, the analyzer distinguishes between two groups of electric field locations (or electric field calculation points). That is, first-group electric field locations are space points each in the midst of two equally-sized cells. Second-group electric field locations are space points surrounded by differently-sized cells.

(S13) Using the equation (18), the electromagnetic field calculation unit 114 calculates the partial derivative of the magnetic field at each first-group electric field location.

(S14) Using the equation (19), the electromagnetic field calculation unit 114 calculates the partial derivative of the magnetic field at each second-group electric field location.

(S15) Based on the partial derivatives of magnetic field obtained in steps S13 and S14, the electromagnetic field calculation unit 114 then calculates electric field values by using the equation (17).

(S16) The electromagnetic field calculation unit 114 calculates electric field components that are directly affected by the boundary conditions. This calculation is performed separately from that of the interior cells. At the end of this calculation, the electromagnetic field calculation unit 114 advances the time step counter T by $\Delta T/2$.

(S17) The electromagnetic field calculation unit 114 calculates magnetic field values from equations (15) and (16).

(S18) The electromagnetic field calculation unit 114 calculates magnetic field components that are directly affected by the boundary conditions. This calculation is performed separately from that of the interior cells. After that, the electromagnetic field calculation unit 114 advances the time step counter T by $\Delta T/2$.

(S19) The electromagnetic field calculation unit 114 determines whether the time step counter T has exceeded the predefined simulation end time Tmax. If so, the process advances to step S20. Otherwise, the process goes back to step S13.

(S20) The electromagnetic field calculation unit 114 sends the calculation results to the data output devices 11a.

The above processing steps analyze the behavior of electromagnetic waves in various environments. The next section will present some examples of electromagnetic analysis according to the present invention.

Propagation of Plane Waves

Figure 7:
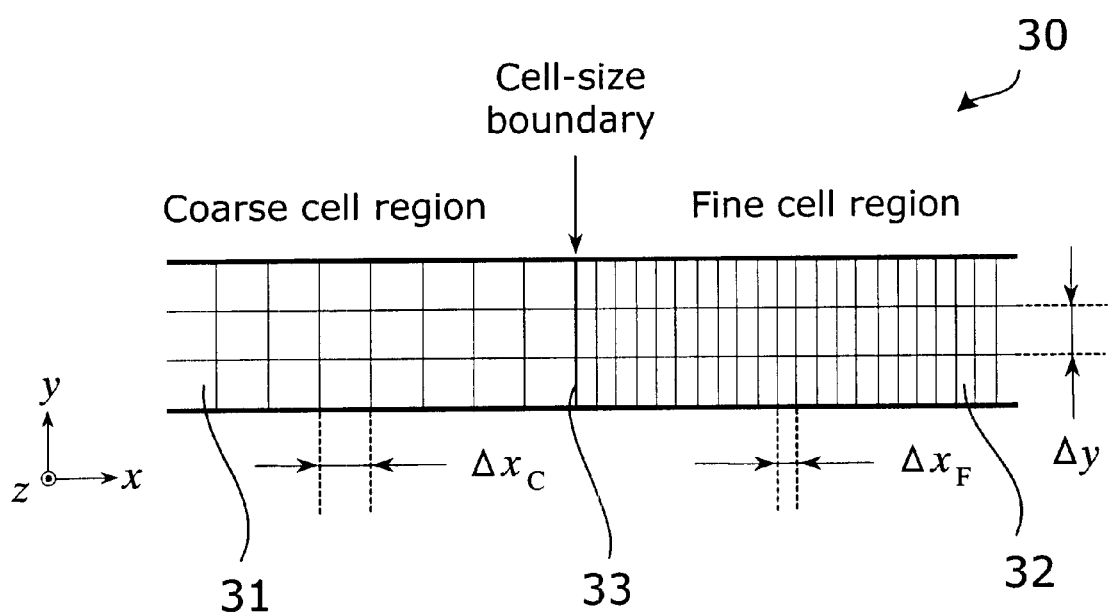
FIG. 7 shows a model for calculating propagation of a plane wave.
Figure 8:
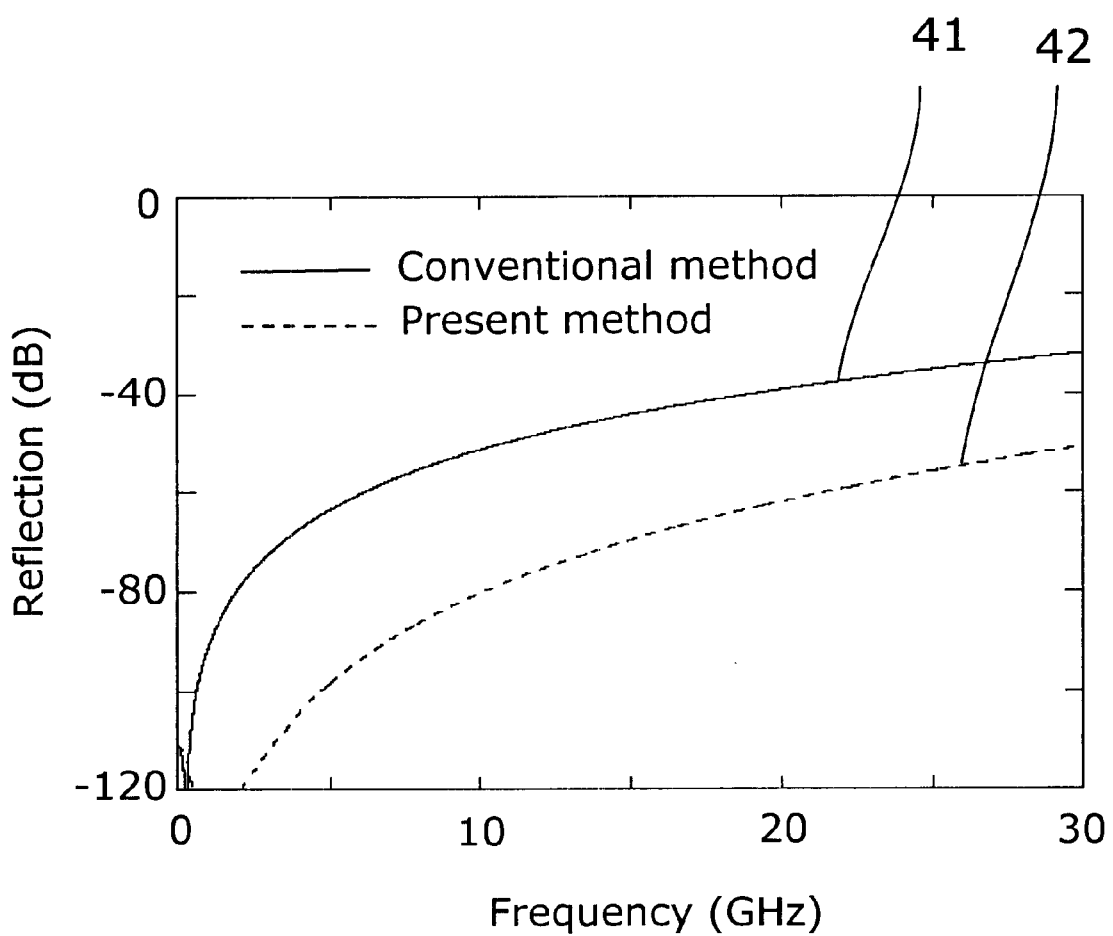
FIG. 8 shows reflection characteristics on a cell-size boundary.

Referring first to FIGS. 7 and 8, an example of plane wave propagation will be described. FIG. 7 shows a simulation model for calculating propagation of a plane wave. It is assumed in FIG. 7 that the X axis runs from left to right, the Y axis runs from bottom to top, and the Z axis runs from back to front (all from the viewer's perspective). Here, our interest is directed to the propagation of two-dimensional TE waves, which will be simulated on a meshed domain of FIG. 7. Electric field components Ex and Ey are located on the edges of each cell, and magnetic field components Hz are centered in the cells.

The computational domain 30 is divided into two parts: a first region 31 consisting of larger cells, and a second region 32 consisting of smaller cells. More specifically, the cells in the coarse cell region 31 have dimensions of $\Delta x_C \times \Delta y$, while those in the fine cell region 32 have dimensions of $\Delta x_F \times \Delta y$. Those two regions 31 and 32 meet at a cell-size boundary 33.

An electrical wall boundary condition is set on each longitudinal side wall of the computational domain 30. While FIG. 7 does not show it explicitly, the computational domain 30 is long enough in the x-axis direction to separate the cell-size boundary 33 sufficiently from the far ends of the domain 30. This separation is needed to avoid the influence of far end reflections in the x-axis direction.

It is desired that any cell-size boundaries be transparent to the object being investigated, because such boundaries are introduced purely for the purpose of ensuring the accuracy of electromagnetic wave analysis. In other words, the presence of a cell-size boundary should not affect the result of analysis. An ideal cell-size boundary is supposed to produce no reflection of electromagnetic waves, when the computational domain is driven by an excitation wave.

To evaluate actual reflection from the cell-size boundary 33 in the computational domain 30, the electric field Ey is excited with a gaussian wave at a certain space point that is far from the cell-size boundary 33 in the −x direction. This pulse wave propagates in the +x direction, and its small portion reflecting back at the cell-size boundary 33 would be observed.

FIG. 8 shows the reflection characteristics of the cell-size boundary 33, where the cell dimensions are given as follows: $\Delta y = \Delta x_C = 1.0$ mm and $\Delta x_F = 0.1$ mm. Here, the fine cell region 32 is ten times finer than the coarse cell region 31 (i.e., $\Delta x_C/\Delta x_F = 10$). In FIG. 8, the horizontal axis represents the frequency (GHz), and the vertical axis shows the reflection (dB). The −120 dB line is the smallest reflection level in the graph. The broken line 42 shows the numerical result obtained with the present method, while the solid line 41 shows the same with the conventional method.

It would be readily understood from FIG. 8 that the proposed method successfully suppresses the reflection level by 20 to 40 dB, with respect to the conventional method. This is supposed to be the effect of reduced discontinuity across the cell-size boundary, where the proposed method can calculate electric field components Ey with smaller truncation errors. Another numerical experiment (not shown) with different dimensional parameters $\Delta y = \Delta x_C = 1.0$ mm and $\Delta x_F = 0.025$ mm ($\Delta x_C/\Delta x_F = 40$) tells us that such excellent characteristics of the proposed method can be maintained even when the cell size changes more drastically.

Reflection Characteristics of Patch Antenna

Figure 9:
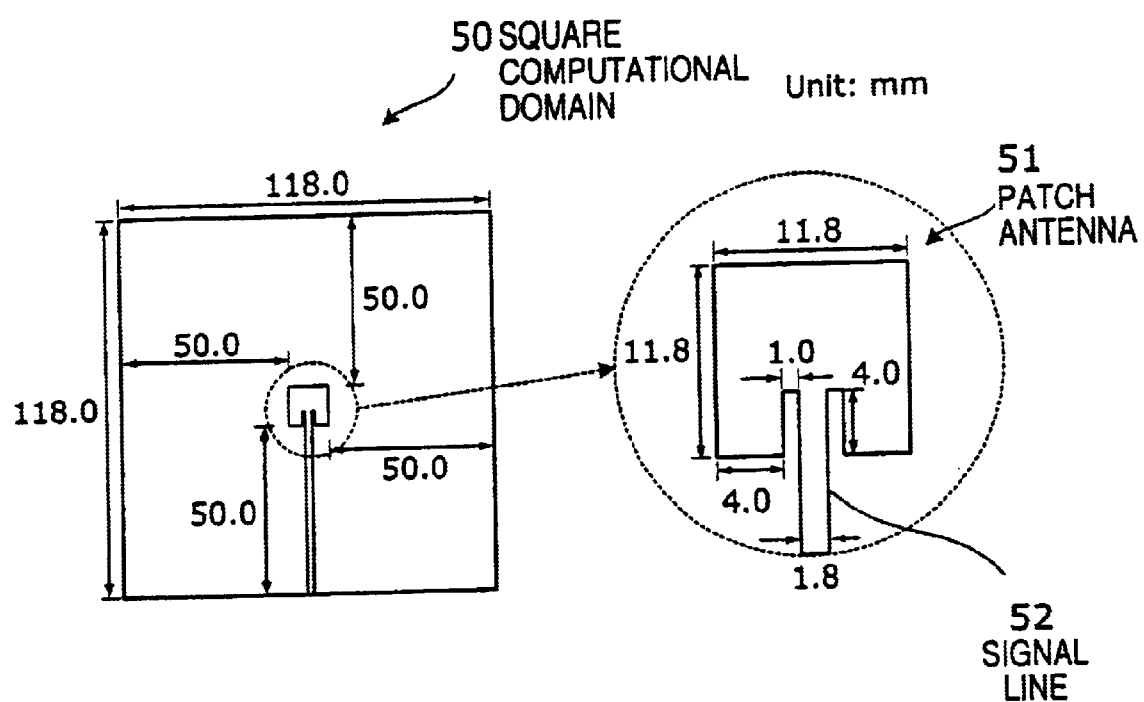
FIG. 9 is a plan view of a patch antenna.

As another specific example of electromagnetic wave analysis, the reflection characteristics of a patch antenna will be discussed with reference to FIGS. 9 to 12. FIG. 9 is a plan view of a typical patch antenna 51, which is placed in a square computational domain 50 with outside dimensions of 118.0×118.0 mm. The patch antenna 51 has a square-shaped top portion with dimensions of 11.8×11.8 mm, which is centered in the computational domain 50, 50.0 mm away from each of the four edges.

A signal line 52 with a width of 1.8 mm provides an electrical connection from an external circuit to the patch antenna 51. Around its junction point with the signal line 52, the patch antenna 51 has a narrow groove on both sides of the signal line 52. The grooves are 1.0 mm wide and 4.0 mm deep. Such a patch antenna 51 is formed on a 0.8 mm thick substrate with a relative dielectric constant of 3.274.

The patch antenna 51 of FIG. 9 is a standard model of a microstrip-fed patch antenna that is defined by the Microwave Simulator Study Group of the Institute of Electronics, Information and Communication Engineers (IEICE) in Japan. One example of such studies is: Takehumi Namiki, Takuji Sakaguchi, Koichi Ito, "A Study of the Calculation Accuracy of the FDTD Method When applied to a Patch Antenna Analysis," IEICE Technical Report, AP99–12, pp. 17–22, May 1999. Another example is: Mitsuo Taguchi, "Use and Evaluation of Electromagnetic Simulators from the Standpoint of Antenna Design," IEICE Journal, Vol. 83, no. 11, pp. 878–883, November 2000. Those papers elaborate on various simulation results for the patch antenna model 51.

Figure 10:
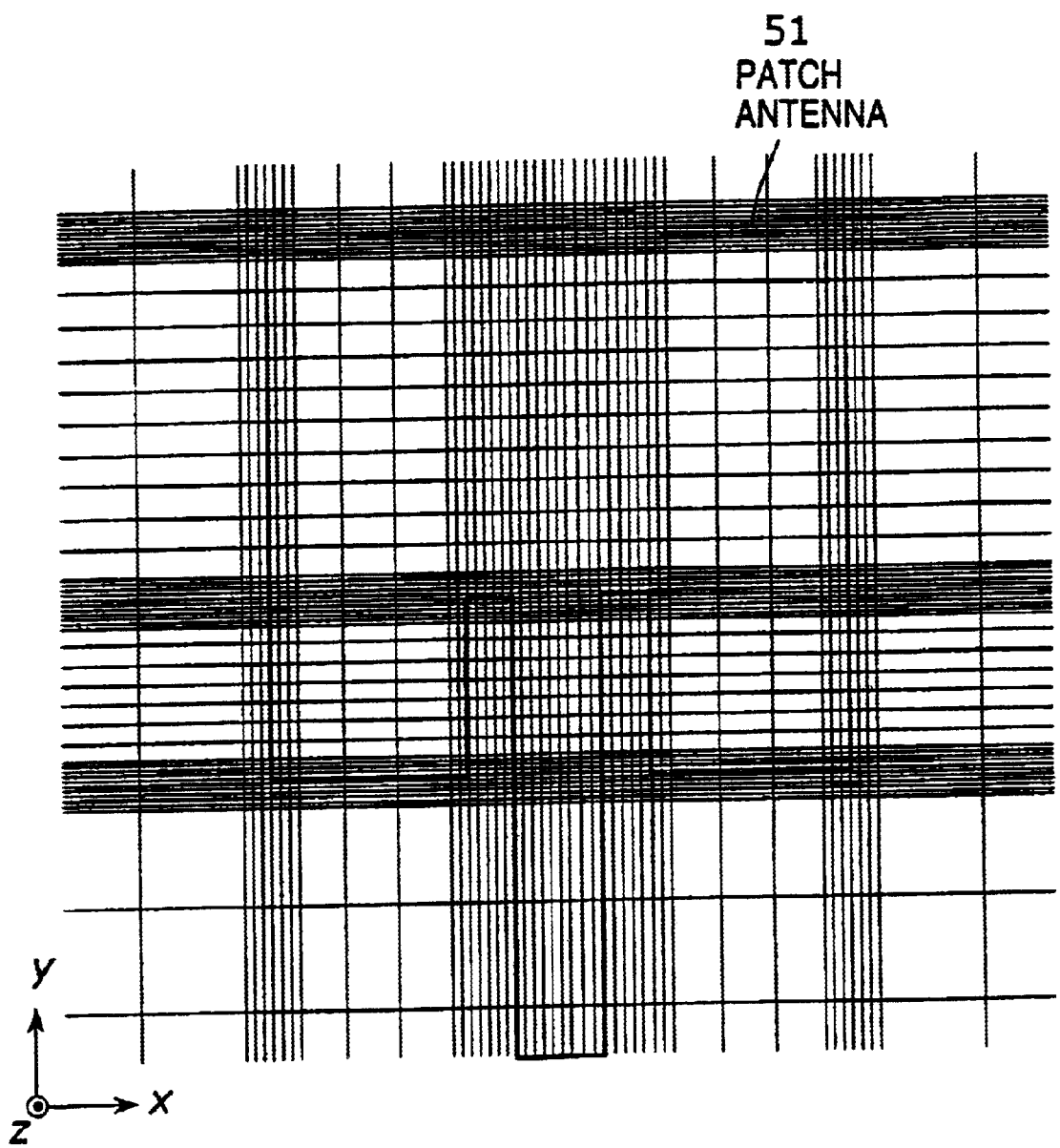
FIG. 10 shows an example of a computational model representing the patch antenna of FIG. 9.

In the present embodiment of the invention, a computational model of the patch antenna 51 is formulated with a non-uniform spatial discretization technique. FIG. 10 shows an example of such a computational model. It is assumed in FIG. 10 that the X axis runs from left to right, the Y axis runs from bottom to top, and the Z axis runs from back to front (all from the viewer's perspective).

Very fine cells are used in the vicinity of the edges of the radiating patch antenna 51, considering the electromagnetic singularity around those edges. For more about such meshing techniques, see the following literatures: E. M. Daniel and C. J. Railton, "Fast finite difference time domain analysis of microstrip patch antennas," IEEE AP-S Digest, pp. 414–417, 1991; and Teruo Onishi, Tatsuya Kashiwa, Yukio Naito, Yoshio Hosoya, "A Study on the Efficiency of FD-TD Analysis of a Patch Antenna Fed by Coaxial Cable" IEICE General Conference, B-1-128, 1997.

While not shown in FIG. 10, the space is also divided in the z-axis direction, where very fine cells are used in the vicinity of the patch antenna 51. As a result of such spatial discretization, the computational model of FIG. 10 contains 76,380 cells in total.

FIG. 11 shows the minimum and maximum cell sizes in the computational model of FIG. 10. X-axis cell sizes $\Delta x$ range from 0.200 mm (Minimum) to 2.000 mm (Maximum). Y-axis cell sizes $\Delta y$ range from 0.050 mm (Minimum) to 2.000 mm (Maximum). Z-axis cell sizes $\Delta z$ range from 0.069 mm (Minimum) to 1.200 mm (Maximum).

Mur's first-order absorbing boundary conditions are set on the outer surfaces of the computational domain. The details of this absorbing boundary condition is described in the literature of: G. Mur, "Absorbing Boundary Conditions for the Finite-Difference Approximation of the Time Domain Electromagnetic Field Equations," IEEE Trans, EMC-23 1981, pp. 377–382.

Figure 12:
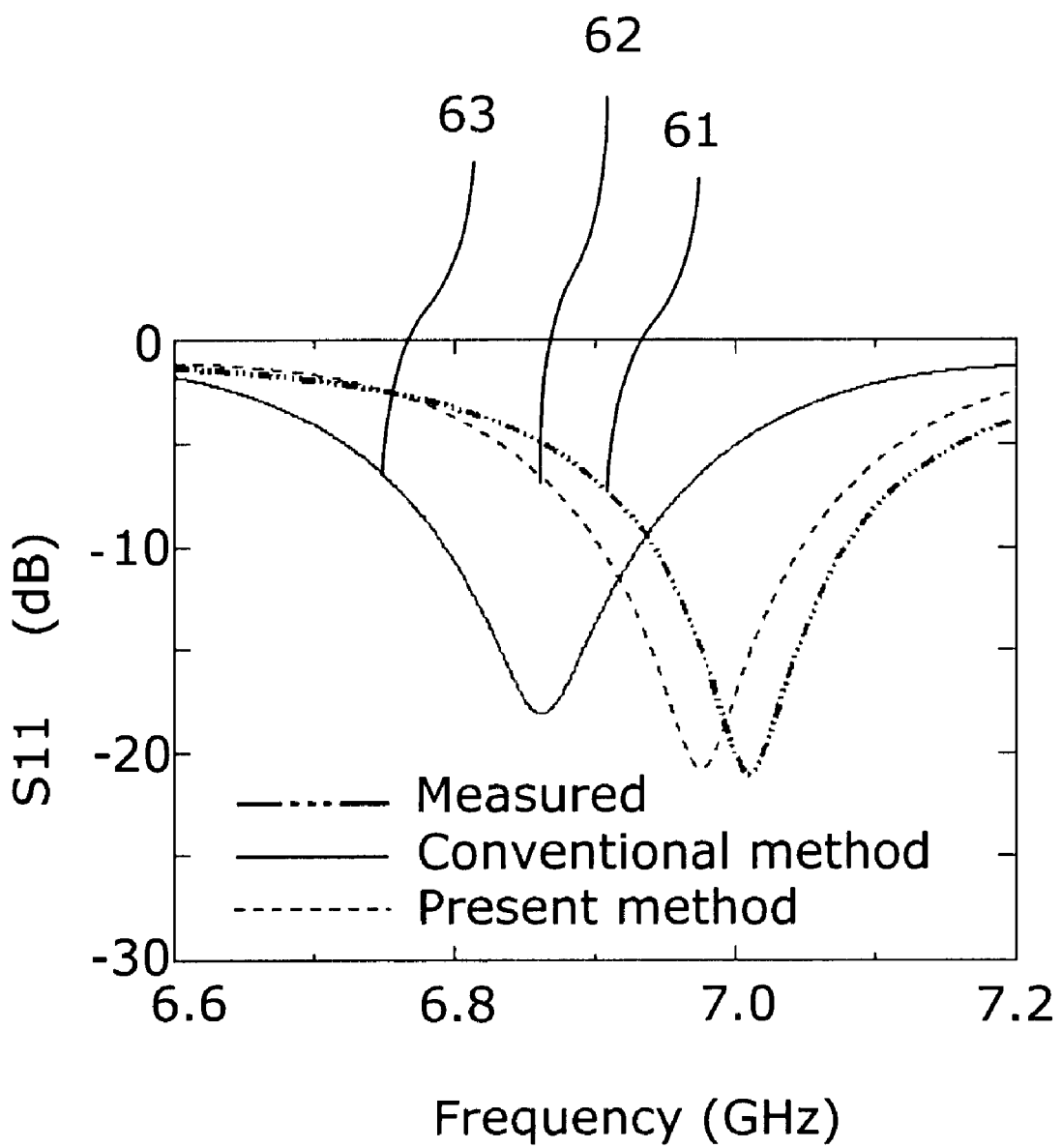
FIG. 12 shows numerical results, in comparison with measurement results, of a reflection analysis that is carried out with the computational model of FIG. 10.

Besides carrying out measurements with a real sample, the reflection characteristics of the patch antenna 51 are numerically calculated, using both the present method and conventional method for comparison purposes. FIG. 12 shows the numerical results, in comparison with the measurement result, of reflection characteristic analysis with the computational model shown in FIG. 10. The horizontal axis gives the frequency in GHz, and the vertical axis the reflection coefficient in dB. The actual measurement result is indicated by the triple-dot-dash line 61. The broken line 62 shows a first numerical result obtained with the present method, while the solid line 63 shows a second numerical result with the conventional method.

As seen from FIG. 12, the first numerical result (line 62) bears a close resemblance to the measurement result (line 61), demonstrating that the present method provides far more accurate and realistic results than the conventional method. Here, the measurement result is known to be sufficiently reliable. This has been proved through an appropriate process which is similar to the method described in the following literature: Takehumi Namiki, Takuji Sakaguchi, Koichi Ito, "A Study of the Calculation Accuracy of the FD-TD Method When applied to a Patch Antenna Analysis," IEICE Technical Report, AP99–12, pp. 17–22, May 1999.

The resonant frequency is extracted from each plot of FIG. 12 and evaluated in terms of relative errors with reference to the measured value. FIG. 13 summarizes the comparison between the present method and conventional method. While the measured resonant frequency is 7.0100 GHz, the conventional method gives a calculated resonant frequency of 6.8624 GHz with a relative error of 2.10 percent. In contrast to this, the proposed method yields a calculated resonant frequency of 6.9756 GHz with a relative error of 0.49 percent. It is obvious from FIGS. 12 and 13 that the present method adds a considerable improvement to the accuracy of numerical results for the computational model of FIG. 10.

Lastly, FIG. 14 shows the CPU time and memory resource consumption in the above-described patch antenna analysis. While the conventional method spent 493 seconds and 5.5

MB, the present method took 666 seconds and 6.4 MB. Both computational sessions were executed on an UltraSPARC II workstation operating at 360 MHz. The proposed method consumes about 1.35 times longer CPU time, as well as requiring 1.16 times bigger memory space, compared with the conventional FD-TD method. However, the advantage of accuracy improvements would be worth allocating that amount of CPU time and memory resources.

According to the aforementioned study of Namiki et al., they successfully obtained an accurate resonate frequency with a relative error of 1.0 percent or less when solving a similar problem with a conventional FD-TD method. That accuracy, however, was not a result of non-uniform spatial discretization, but was accomplished by dividing a computational domain into a large number of fine uniform cells. For that numerical analysis, Namiki et al. used a workstation of a similar performance level, consuming as long CPU time as more than 600 minutes and as large memory space as 250 MB. In view of those results, there is no doubt that the present method is advantageous over the conventional ones.

The above-described processing mechanisms are actually implemented as software functions of a computer system, the instructions being encoded and provided in the form of computer programs. The computer system executes such programs to provide the intended functions of the present invention. The programs are stored in a computer-readable medium for the purpose of storage and distribution. Suitable computer-readable storage media include magnetic storage media, optical discs, magneto-optical storage media, and solid state memory devices. Magnetic storage media include hard disk drives (HDD), flexible disks (FD), and magnetic tapes. Optical discs may include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the circulation of computer programs. Network-based distribution of software programs is also possible, in which the program files stored in a server computer are downloaded to client computers via the network.

The computer system stores the above programs in its local storage unit, which have been previously installed from a portable storage media or downloaded from a remote server computer. The computer provides the intended functions by executing the programs read out of the local storage unit. As an alternative way of program execution, the client computer may execute the programs directly from a portable storage medium. Another alternative method is that the server computer supplies a client computer with the programs dynamically, allowing it to execute them upon delivery.

The above discussion is summarized as follows. According to the present invention, the electromagnetic wave analyzer is configured to use a more accurate algorithm to calculate electromagnetic field components at particular space points that are surrounded by differently-sized cells. This feature suppresses computational errors on a boundary between two different cell regions (cell-size boundary), thus improving the accuracy of electromagnetic analysis with a reasonable processing workload.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An electromagnetic wave analyzer which divides a given computational domain into a plurality of cells and numerically analyzes transitional behavior of electromagnetic fields on an individual cell basis, comprising:
    cell size identification means for identifying uniformity of cells that surround each space point defined in the computational domain;
    first calculation means for calculating electromagnetic field components at a space point with a first calculation method when the cell size identification means has identified the surrounding cells as being uniform in size;
    second calculation means for calculating electromagnetic field components at a space point with a second calculation method when the cell size identification means has identified the surrounding cells as being non-uniform in size, the second calculation method having smaller computational errors than those of the first calculation method; and
    data output means for outputting the electromagnetic field components at every space point which have been calculated by the first and second calculation means.

2. The electromagnetic wave analyzer according to claim 1, wherein the second calculation means uses an implicit scheme as the second calculation method.

3. The electromagnetic wave analyzer according to claim 2, wherein the second calculation means uses the implicit scheme to calculate partial derivatives of the electromagnetic field components at a space point surrounded by non-uniform cells.

4. The electromagnetic wave analyzer according to claim 3, wherein:
    the first calculation means calculates partial derivatives of the electromagnetic field components at space points surrounded by uniform cells; and
    the second calculation means receives from the first calculation means the partial derivatives of electromagnetic field components in the vicinity of the space point surrounded by non-uniform cells, and solves the implicit scheme with the received partial derivatives.

5. The electromagnetic wave analyzer according to claim 1, wherein:
    the computational domain has at least one coordinated axis along which the cells are aligned; and
    the cell size identification means identifies the uniformity of cells that surround each space point by evaluating dimensions of the cells on an individual axis direction basis.

6. A computer program product which enables a computer to divide a given computational domain into a plurality of cells and numerically analyze transitional behavior of electromagnetic fields on an individual cell basis, the computer program product causing the computer to perform the steps of:
    (a) identifying uniformity of cells that surround each space point defined in the computational domain;
    (b) calculating electromagnetic field components at a space point with a first calculation method when the surrounding cells are identified as being uniform in size;
    (c) calculating electromagnetic field components at a space point with a second calculation method when the surrounding cells are identified as being non-uniform in size, the second calculation method having smaller computational errors than those of the first calculation method; and (d) outputting the electromagnetic field components at every space point which have been calculated in the first and second calculating steps (b) and (c).

7. The computer program product according to claim 6, wherein the second calculating step (c) uses an implicit scheme as the second calculation method.

8. The computer program product according to claim 7, wherein the second calculating step (c) uses the implicit scheme to calculate partial derivatives of the electromagnetic field components at the space point that is surrounded by non-uniform cells.

9. The computer program product according to claim 8, wherein:

the first calculating step (b) calculates partial derivatives of the electromagnetic field components at space points surrounded by uniform cells; and the second calculating step (c) receives the partial derivatives of electromagnetic field components in the vicinity of the space point surrounded by non-uniform cells, which are calculated in the first calculating step (b), and solves the implicit scheme with the received partial derivatives.

10. The computer program product according to claim 6, wherein:

the computational domain has at least one coordinated axis along which the cells are aligned; and the identifying step (a) identifies the uniformity of cells that surround each space point by evaluating dimensions of the cells on an individual axis direction basis.

11. A computer-readable storage medium containing an electromagnetic wave analyzing program which divides a given computational domain into a plurality of cells and numerically analyzes transitional behavior of electromagnetic fields on an individual cell basis, the electromagnetic wave analyzing program causing a computer to execute the steps of:

(a) identifying uniformity of cells that surround each space point defined in the computational domain;

(b) calculating electromagnetic field components at a space point with a first calculation method when the surrounding cells are identified as being uniform in size;

(c) calculating electromagnetic field components at a space point with a second calculation method when the surrounding cells are identified as being non-uniform in size, the second calculation method having smaller computational errors than those of the first calculation method; and (d) outputting the electromagnetic field components at every space point which have been calculated in the first and second calculating steps (b) and (c).

12. An electromagnetic wave analyzing method which divides a given computational domain into a plurality of cells and numerically analyzes transitional behavior of electromagnetic fields on an individual cell basis, comprising the steps of:

(a) identifying uniformity of cells that surround each space point defined in the computational domain;

(b) calculating electromagnetic field components at a space point with a first calculation method when the surrounding cells are identified as being uniform in size;

(c) calculating electromagnetic field components at a space point with a second calculation method when the surrounding cells are identified as being non-uniform in size, the second calculation method having smaller computational errors than those of the first calculation method; and (d) outputting the electromagnetic field components at every space point which have been calculated in the first and second calculating steps (b) and (c).

* * * * *